(12) United States Patent
Li et al.

(10) Patent No.: US 10,594,239 B2
(45) Date of Patent: Mar. 17, 2020

(54) MOTOR DRIVE DEVICE AND REFRIGERATION EQUIPMENT

(71) Applicant: Hitachi-Johnson Controls Air Conditioning, Inc., Tokyo (JP)

(72) Inventors: Dongsheng Li, Tokyo (JP); Ken Kishita, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 16/076,732

(22) PCT Filed: Nov. 9, 2017

(86) PCT No.: PCT/JP2017/040414
§ 371 (c)(1),
(2) Date: Aug. 9, 2018

(87) PCT Pub. No.: WO2018/131273
PCT Pub. Date: Jul. 19, 2018

(65) Prior Publication Data
US 2019/0052210 A1    Feb. 14, 2019

(30) Foreign Application Priority Data

Jan. 11, 2017 (JP) .................................. 2017-002526

(51) Int. Cl.
*H02P 21/05* (2006.01)
*H02P 21/18* (2016.01)
(Continued)

(52) U.S. Cl.
CPC .............. *H02P 21/05* (2013.01); *F25B 31/02* (2013.01); *H02M 1/12* (2013.01); *H02M 1/14* (2013.01);
(Continued)

(58) Field of Classification Search
CPC .......... H02P 21/05; H02P 21/18; H02P 21/22; H02M 1/12; H02M 1/14
(Continued)

(56) References Cited

U.S. PATENT DOCUMENTS 5,526,252 A * 6/1996 Erdman .................... H02J 3/06
323/207
5,625,264 A * 4/1997 Yoon ......................... H02P 6/10
318/400.06
(Continued)

FOREIGN PATENT DOCUMENTS

CN         1808890 A       7/2006
CN       101449456 A       6/2009
(Continued)

OTHER PUBLICATIONS

International Search Report of PCT/JP2017/040414 dated Jan. 30, 2018.
(Continued)

*Primary Examiner* — Kawing Chan
(74) *Attorney, Agent, or Firm* — Mattingly & Malur, PC

(57) ABSTRACT

A motor drive that enables the elimination of distortion of a motor current caused by direct current voltage ripples with the use of a smoothing capacitor having a small capacity and refrigeration equipment. A motor drive includes a rectifier circuit, a smoothing capacitor, voltage detector, an inverter circuit, current sensor, and a controller configured to control the inverter circuit. The controller has a voltage controller configured to generate a voltage command value used for controlling the motor, a ripple frequency arithmetic unit configured to operate a ripple frequency included in the direct current voltage signal, and a harmonic suppressor configured to process a signal based on the direct current signal using an S controller having a gain near the ripple frequency and output a corrected amount. The inverter
(Continued)

circuit is controlled based on a signal that the voltage command value is corrected using the corrected amount.

4 Claims, 9 Drawing Sheets

(51) Int. Cl.

| | | |
|---|---|---|
| H02P 21/22 | (2016.01) | |
| F25B 31/02 | (2006.01) | |
| H02M 7/5387 | (2007.01) | |
| H02P 27/12 | (2006.01) | |
| H02M 1/14 | (2006.01) | |
| H02M 7/48 | (2007.01) | |
| H02M 1/12 | (2006.01) | |
| H02M 7/5395 | (2006.01) | |
| H02M 1/00 | (2006.01) | |

(52) U.S. Cl.
CPC ........... *H02M 7/48* (2013.01); *H02M 7/5395* (2013.01); *H02M 7/53871* (2013.01); *H02M 7/53875* (2013.01); *H02P 21/18* (2016.02); *H02P 21/22* (2016.02); *H02P 27/12* (2013.01); *F25B 2500/13* (2013.01); *F25B 2600/021* (2013.01); *H02M 2001/0009* (2013.01)

(58) Field of Classification Search
USPC .................................................. 318/400.02
See application file for complete search history.

(56) References Cited

U.S. PATENT DOCUMENTS

| | | | |
|---|---|---|---|
| 6,307,759 B1 | 10/2001 | Inarida et al. | |
| 6,437,997 B1 | 8/2002 | Inarida et al. | |
| 2007/0132424 A1* | 6/2007 | Takao | H02P 21/14 318/806 |
| 2008/0061726 A1* | 3/2008 | Iwaji | H02P 6/10 318/723 |
| 2011/0043150 A1* | 2/2011 | Ogawa | H02M 5/458 318/400.26 |
| 2012/0306411 A1* | 12/2012 | Tadano | H02P 21/05 318/400.02 |
| 2013/0082636 A1* | 4/2013 | Ohori | H02P 4/00 318/723 |
| 2013/0300334 A1* | 11/2013 | Tooyama | H02M 1/12 318/504 |
| 2013/0307449 A1* | 11/2013 | Kobayashi | B60K 6/48 318/400.02 |
| 2014/0145660 A1* | 5/2014 | Shimada | H02P 6/183 318/400.33 |
| 2014/0328091 A1* | 11/2014 | Sakakibara | H02M 5/458 363/37 |
| 2015/0256095 A1* | 9/2015 | Ohta | H02M 7/4826 363/37 |
| 2015/0318808 A1* | 11/2015 | Okubo | H02K 29/03 318/400.02 |
| 2016/0013738 A1* | 1/2016 | Hozuki | H02P 6/10 318/400.02 |
| 2016/0349717 A1* | 12/2016 | Tadano | G05B 13/045 |
| 2018/0191288 A1* | 7/2018 | Li | H02P 21/00 |
| 2019/0097559 A1* | 3/2019 | Li | F25B 1/00 |

FOREIGN PATENT DOCUMENTS

| | | |
|---|---|---|
| EP | 2 034 605 A1 | 3/2009 |
| JP | 2005-198402 A | 7/2005 |
| JP | 2007-259698 A | 10/2007 |
| JP | 4120868 B2 | 7/2008 |
| JP | 2015-42010 A | 3/2015 |
| JP | 2016-127736 A | 7/2016 |

OTHER PUBLICATIONS

Chinese Office Action received in corresponding Chinese Application No. 201780036271.4 dated Jun. 25, 2019.

* cited by examiner

MOTOR DRIVE DEVICE AND REFRIGERATION EQUIPMENT

TECHNICAL FIELD

The present invention relates to a motor drive device and a refrigeration apparatus equipped with the same, and more specifically to a motor drive device that drives a motor using an inverter that converts an alternating power voltage into a direct current voltage and converts the direct current voltage into an alternating current voltage, the motor drive device eliminating the distortion of a motor current caused by the influence of voltage ripples of the direct current voltage and reducing torque ripples, vibrations, and noise of the motor, and a refrigeration apparatus equipped with the same.

BACKGROUND ART

Conventionally, a motor drive device is widely used in refrigeration equipment such as air conditioners, and industrial machines. The motor drive device includes a rectifier circuit configured to convert an alternating current voltage supplied from an alternating power supply into a direct current voltage and an inverter configured to convert the direct current voltage from the rectifier circuit into an alternating current voltage.

In this motor drive device, in the case where a single-phase alternating current voltage or three-phase alternating current voltages are converted into a direct current voltage at a diode rectifier circuit, voltage ripples are generated in the direct current voltage. The voltage ripples have a frequency component twice or six times an alternating power supply frequency $f_s$ inputted to the rectifier circuit. The voltage ripples can be reduced when the capacity of a smoothing capacitor connected on the output side of the rectifier circuit is increased. However, an increase in the capacity of the smoothing capacitor causes an increase in the cost and volume of the motor drive device, which is a problem.

In the case where voltage ripples are present in the direct current voltage, the output voltage of the inverter includes a direct current voltage ripple frequency $\omega_{rp}$ component due to influence, such as the detection delay of the direct current voltage and the arithmetic operation delay of an inverter controller. Thus, the distortion of the motor current is generated.

Specifically, in the case where the resistance r of the winding wire of the motor driven by the inverter or the inductance L of the motor is small, when the output frequency of the inverter comes close to the direct current voltage ripple frequency, "the frequency component that is the difference" between these two frequencies generates the distortion of the motor current and a large pulsating current, resulting in a beat phenomenon in which the output torque of the motor pulsates.

An example of a method of eliminating this beat phenomenon is disclosed in PTL 1. PTL 1 discloses a method in which the high frequency component of a γ-δ axis current in a rotating coordinate system is detected, three-phase current beat (distortion) components are operated, the operated values of these components are amplified, and then three-phase voltage command values are corrected.

CITATION LIST

Patent Literature

PTL 1: Japanese Patent No. 4120868

SUMMARY OF INVENTION

Technical Problem

However, the method described in PTL 1 needs high-pass filters in order to extract the high frequency component of the γ-δ axis current in the rotating coordinate system. Thus, in the case where the difference between the power supply frequencies (50 Hz and 60 Hz) and frequency errors, for example, is present, gains, for example, set to the high-pass filters have to be finely adjusted in order to improve the effect of eliminating the beat phenomenon. In the case where the high-pass filters are implemented using discrete controllers, such as a microcomputer or a DSP (digital signal processor), influence, such as time delay caused by the control (arithmetic operation) period of discrete control, is unignorable.

Therefore, the present invention is to provide a motor drive device that estimates the ripple frequency of a direct current voltage from the detection signal of the direct current voltage, sets the estimated ripple frequency to a sine wave transfer function controller (in the following, referred to as "the S controller") having a gain to a specific frequency, and enables the elimination of the beat phenomenon of the output torque of a motor with no need of an additional component such as a bypass filter and a dedicated detection circuit, and refrigeration equipment.

Solution to Problem

In order to solve the problem, a motor drive device according to the present invention is a motor drive device having an alternating power supply connected on an input side and a motor connected on an output side, the motor drive device including: a rectifier circuit configured to convert an alternating current voltage supplied from the alternating power supply into a direct current voltage; a smoothing capacitor configured to smooth a direct current voltage outputted from the rectifier circuit, the smoothing capacitor being formed of a film capacitor or a capacitor having a capacity of 200 microfarad or less; voltage detecting means configured to detect a voltage across the smoothing capacitor and output a direct current voltage signal; an inverter circuit configured to convert a direct current voltage outputted from the smoothing capacitor into an alternating current voltage; current sensing means configured to detect a direct current or an alternating current of the inverter circuit and output a current signal; and a controller configured to control the inverter circuit based on the direct current voltage signal and the current signal. The controller includes a voltage controller configured to generate a voltage command value used for controlling the motor, a ripple frequency arithmetic unit configured to operate a ripple frequency included in the direct current voltage signal, and a harmonic suppressor configured to process a signal based on the current signal using an S controller having a gain near the ripple frequency and output a corrected amount. The inverter circuit is controlled based on a signal that the voltage command value is corrected using the corrected amount.

Advantageous Effects of Invention

In accordance with the present invention, a motor drive device that eliminates the distortion of the motor current caused by direct current voltage ripples and eliminates the beat phenomenon of the output torque of a motor without adopting a smoothing capacitor having a large capacity and with no need of an additional component such as a dedicated detection circuit, and refrigeration equipment can be provided.

DESCRIPTION OF EMBODIMENTS

In the following, embodiments of the present invention the will be described with reference to the drawings.

First Embodiment

A motor drive device according to a first embodiment of the present invention will be described with reference to FIGS. 1 to 10.

Figure 1:
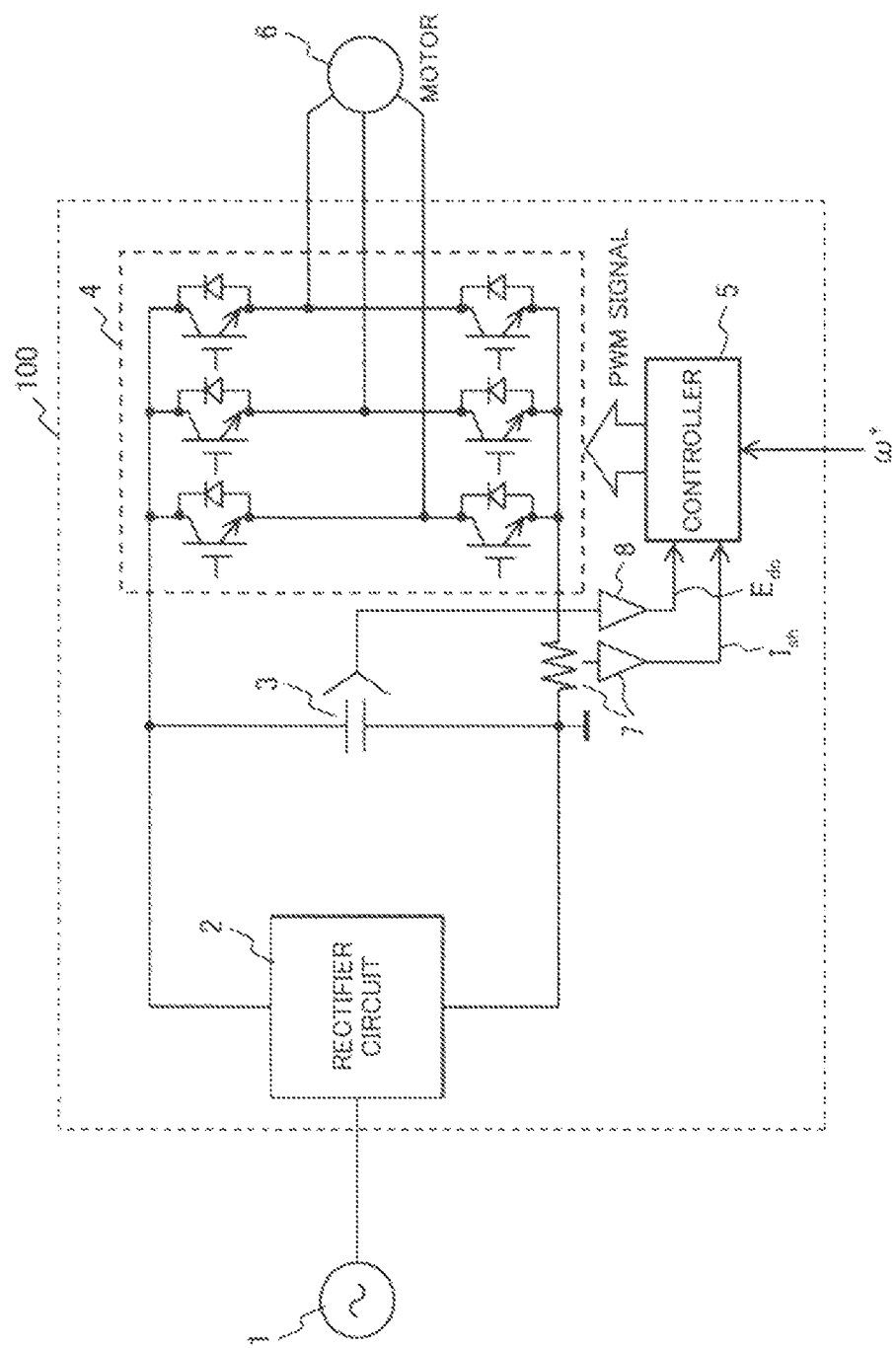
FIG. 1 is a block diagram of a motor drive device according to a first embodiment.

FIG. 1 is a diagram of the overall structure of a motor drive device 100 according to the embodiment. As illustrated in FIG. 1, to the motor drive device 100, an alternating power supply 1 and a motor 6 are connected. The motor drive device 100 mainly includes a rectifier circuit 2, a smoothing capacitor 3, an inverter circuit 4, a controller 5, a current sensing circuit 7, and a direct voltage sensing circuit 8. The rectifier circuit 2 is connected to the alternating power supply 1, and converts an alternating current voltage from the alternating power supply 1 into a direct current voltage. The smoothing capacitor 3 is connected to the direct current output terminal of the rectifier circuit 2, and smooths the direct current voltage that is the output of the rectifier circuit 2. The inverter circuit 4 turns on and off semiconductor switching devices, such as an IGBT and a power MOS, according to a PWM signal inputted from the controller 5, converts a direct current voltage that is the output of the smoothing capacitor 3 into an alternating current voltage, outputs the alternating current voltage, and controls the number of revolutions or torque of the motor 6.

Here, for the smoothing capacitor 3 according to the embodiment, a long life, small-sized capacitor, such as a film capacitor having a capacity of a few tens to 200 μF (microfarad) is used, instead of a typical electrolytic capacitor having a large capacity. Although a reduction in the capacity of the capacitor increases a ripple component in the direct current voltage, a reduction in the size and cost of the motor drive device 100 and an increase in the lifetime of the motor drive device 100 can be achieved.

The current sensing circuit 7 detects the direct current (the bus current) of the inverter circuit 4 using a shunt resistor provided between the smoothing capacitor 3 and the inverter circuit 4, and outputs a bus current signal $I_{sh}$. The direct voltage sensing circuit 8 detects the direct current voltage across the smoothing capacitor 3, and outputs a direct current voltage signal $E_{dc}$. The controller 5 generates a PWM signal that controls the inverter circuit 4 based on a speed command value ω* inputted from a host system and the outputs of the current sensing circuit 7 and the direct voltage sensing circuit 8. Note that, the controller 5 uses a microcomputer or a semiconductor arithmetic operation device such as a DSP.

Figure 2:
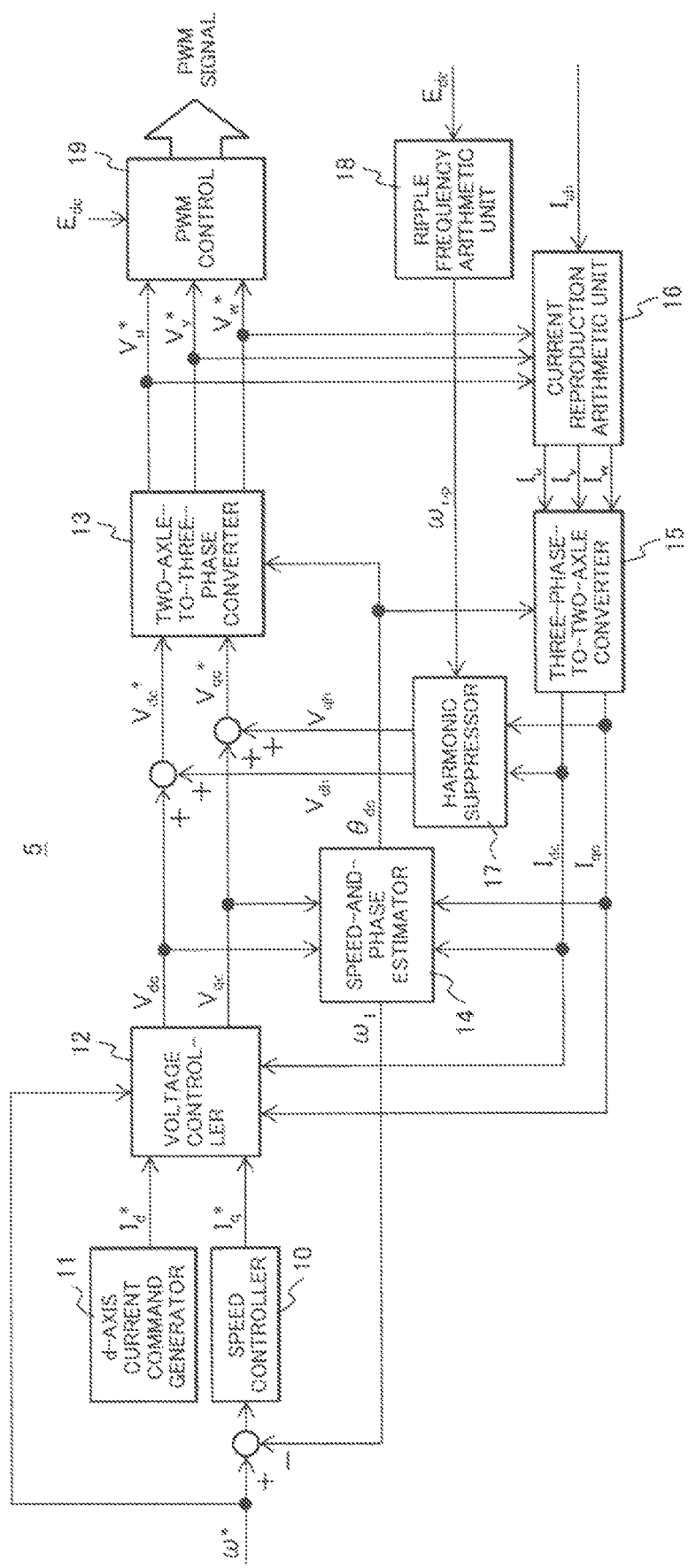
FIG. 2 is a functional block diagram of a controller according to the first embodiment.

FIG. 2 is a functional block diagram of the controller 5 that operates a voltage command signal to be applied to the motor 6 and generates a PWM control signal that controls the inverter circuit 4. The functions are implemented by a CPU (a computer) and an arithmetic operation program. As illustrated in FIG. 2, the controller 5 operates voltage command signals ($V_u^*$, $V_v^*$, and $V_w^*$) to be applied to the motor 6 by dq vector control, and generates a PWM signal that is the control signal for the inverter circuit 4. As illustrated in FIG. 2, the controller 5 includes a speed controller 10, a d-axis current command generator 11, a voltage controller 12, a two-axle-to-three-phase converter 13, a speed-and-phase estimator 14, a three-phase-to-two-axle converter 15, a current reproduction arithmetic unit 16, a harmonic suppressor 17, a ripple frequency arithmetic unit 18, and a PWM controller 19.

Among these components, the current reproduction arithmetic unit 16 reproduces output currents $I_u$, $I_v$, and $I_w$ of the inverter circuit 4 using the bus current signal $I_{sh}$ outputted from the current sensing circuit 7 and three-phase voltage command values $V_u^*$, $V_v^*$, and $V_w^*$ outputted from the two-axle-to-three-phase converter 13. Note that, in FIG. 2, a method is adopted in which the three-phase output currents $I_u$, $I_v$, and $I_w$ are reproduced from the bus current signal $I_{sh}$ for cost reduction. However, current sensing means, such as a current sensor, may be used to detect an alternating current that is the output of the inverter circuit 4. In this case, three-phase electric currents detected at the current sensing means only have to be inputted to the three-phase-to-two-axle converter 15.

Figure 3:
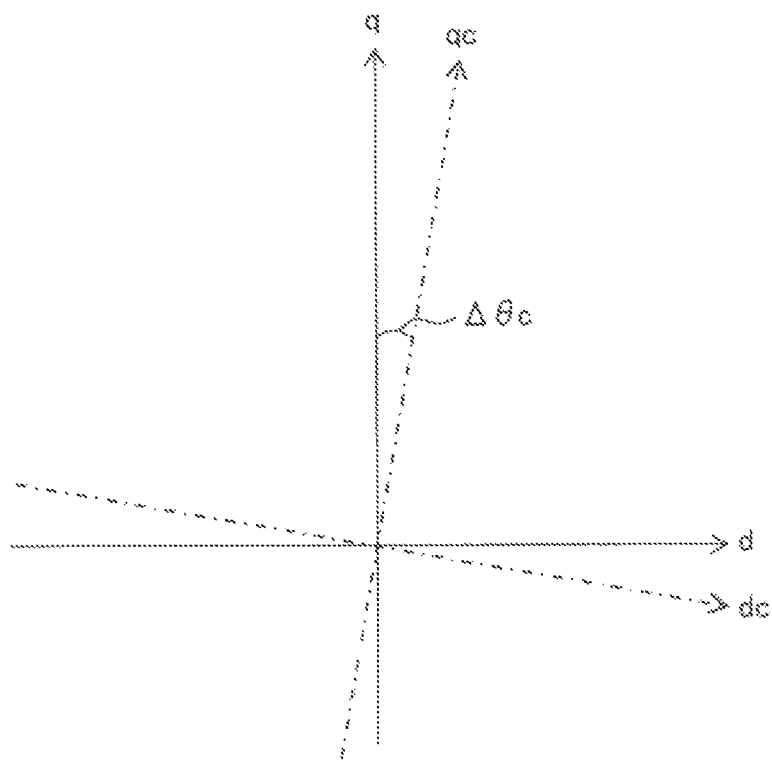
FIG. 3 is a diagram of the control axis of the motor drive device according to the first embodiment and a motor rotation axis.

FIG. 3 is a diagram of the control axis of the motor drive device 100 according to the embodiment and a motor rotation axis. In FIG. 3, a dc-qc axis is defined as the estimated axis of the control system, a d-q axis is defined as the motor rotation axis, and an axis error between the d-q axis and the dc-qc axis is defined as $\Delta\theta_c$. At this time, the three-phase-to-two-axle converter 15 operates a dc-axis current detection value $I_{dc}$ and a qc-axis current detection value $I_{qc}$ using the three-phase output currents $I_u$, $I_v$, and $I_w$ reproduced at the current reproduction arithmetic unit 16 and phase information $\theta_{dc}$ estimated at the speed-and-phase estimator 14 based on Equation 1 and Equation 2.

[Eq. 1]

$$\begin{pmatrix} I_\alpha \\ I_\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} I_u \\ I_v \\ I_w \end{pmatrix} \quad \text{Eq. 1}$$

[Eq. 2]

$$\begin{pmatrix} I_{dc} \\ I_{qc} \end{pmatrix} = \begin{pmatrix} \cos(\theta_{dc}) & -\sin(\theta_{dc}) \\ \sin(\theta_{dc}) & \cos(\theta_{dc}) \end{pmatrix} \begin{pmatrix} I_\alpha \\ I_\beta \end{pmatrix} \quad \text{Eq. 2}$$

The speed controller 10 outputs a q-axis current command value $I_q^*$ according to an external speed command value $\omega^*$ and the deviation of a motor rotation speed estimation value $\omega_1$. The d-axis current command generator 11 outputs a d-axis electric current command value $I_d^*$ that minimizes a motor current.

The voltage controller 12 operates a dc-axis voltage command value $V_{dc}$ and a qc-axis voltage command value $V_{qc}$ used for controlling the motor 6 using the d-axis electric current command value $I_d^*$, the q-axis current command value $I_q^*$, the dc-axis current detection value $I_{dc}$, the qc-axis current detection value $I_{qc}$, and the speed command value $\omega^*$, which are described above, and motor constants registered in advance (a winding resistance r and q-axis inductances Ld and Lq, for example). The voltage control by the voltage controller 12 is known, and the detailed description is omitted.

Subsequently, a speed-and-phase estimation method for implementing motor position sensorless control will be described in detail.

Figure 4:
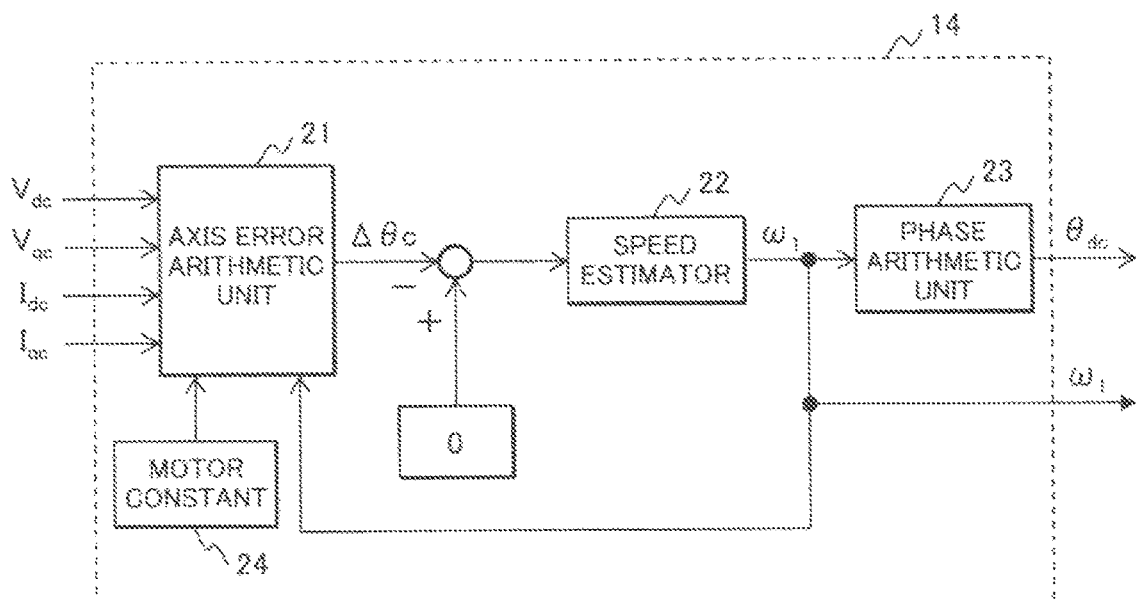
FIG. 4 is a block diagram of a speed-and-phase estimator of the motor drive device according to the first embodiment.

FIG. 4 is a detailed functional block diagram of the speed-and-phase estimator 14 in FIG. 2. This speed-and-phase estimator 14 estimates the position of a rotor and the rotation speed according to a motor rotor position sensorless control method. Specifically, the speed-and-phase estimator 14 includes an axis error arithmetic unit 21 that operates the axis error $\Delta\theta_c$ between the motor shaft (dq axis) and the control system axis (the dc-qc axis), a speed estimator 22 that estimates the motor rotation speed estimation value $\omega_1$, and the phase arithmetic unit 23 that operates the phase information $\theta_{dc}$ of the control system. The speed-and-phase estimator 14 holds the matching of the axis error $\Delta\theta_c$ with the command value (=0).

The axis error arithmetic unit 21 operates the axis error $\Delta\theta_c$ using Equation 3 below based on the dc-axis voltage command value $V_{dc}$, the qc-axis command voltage value $V_{qc}$, the dc-axis current value $I_{dc}$, the qc-axis current value $I_{qc}$, and the motor constant 24, which are described above, and the motor rotation speed estimation value $\omega_1$, to be described later.

[Eq. 3]

$$\Delta\theta_c = \tan^{-1}\left( \frac{V_{dc} - r \times I_{dc} + \omega_1 \times L_q \times I_{qc}}{V_{qc} - r \times I_{qc} + \omega_1 \times L_q \times I_{dc}} \right) \quad \text{Eq. 3}$$

The speed estimator 22 processes the axis error $\Delta\theta_c$ outputted from the axis error arithmetic unit 21 using a so-called PI controller, and outputs the motor rotation speed estimation value $\omega_1$. Here, the PI controller performs PLL (Phase-Locked Loop) control so as to eliminate the axis error $\Delta\theta_c$ estimated at the axis error arithmetic unit 21. The phase arithmetic unit 23 integrates the motor rotation speed estimation value $\omega_1$, and operates and outputs the phase information $\theta_{dc}$ of the control system.

With the use of the speed-and-phase estimator 14 described above, the motor rotation speed estimation value $\omega_1$ and the phase information $\theta_{dc}$ can be obtained. Thus, the rotor position sensor of the motor 6 can be omitted, and this enables a cost reduction in the overall system. Of course, a configuration may be possible in which a rotor position sensor, such as an encoder, is adopted to detect the speed and the positional information on the rotor all the time.

Subsequently to the basic principle of motor control according to the embodiment described above, motor current distortion caused by direct current voltage ripples will be described.

Figure 5:
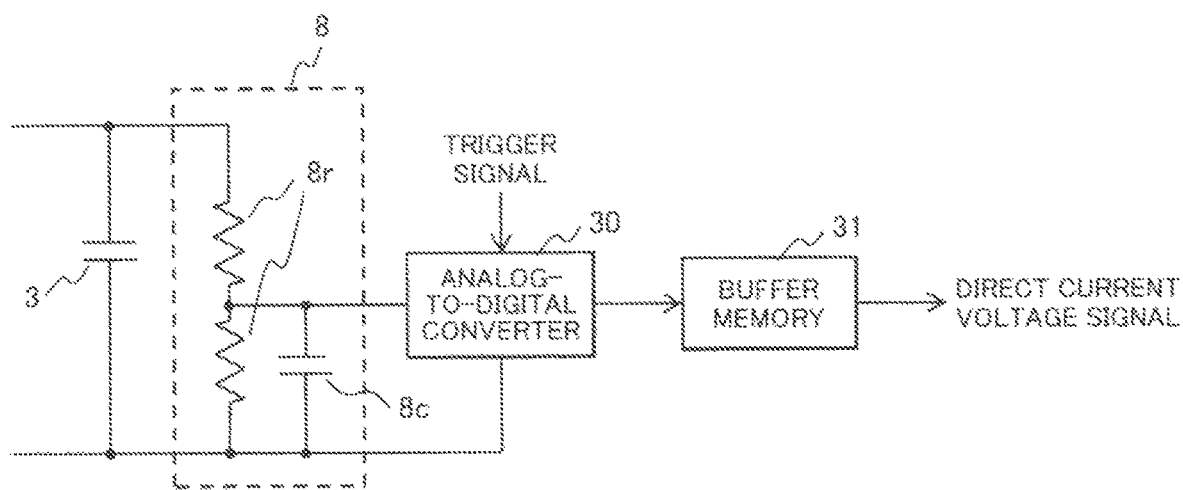
FIG. 5 is a block diagram of a direct voltage sensing circuit and an analog-to-digital converter of the motor drive device according to the first embodiment.

FIG. 5 is a diagram of the circuit configuration of the direct voltage sensing circuit 8 illustrated in FIG. 1 and the connection of an analog-to-digital converter 30 built in the controller 5. As illustrated in FIG. 5, since the direct voltage sensing circuit 8 has a low-pass filter configured of resistors 8r and a capacitor 8c, a voltage delayed from the actual direct current voltage is inputted to the analog-to-digital converter 30. The analog-to-digital converter 30 starts the conversion of the inputted analog signal into a digital signal according to a trigger signal, and then temporarily stores the converted digital signal on a buffer memory 31. Thus, in the analog-to-digital converter 30, a time delay that is one trigger period (a control period) is generated.

Figure 6:
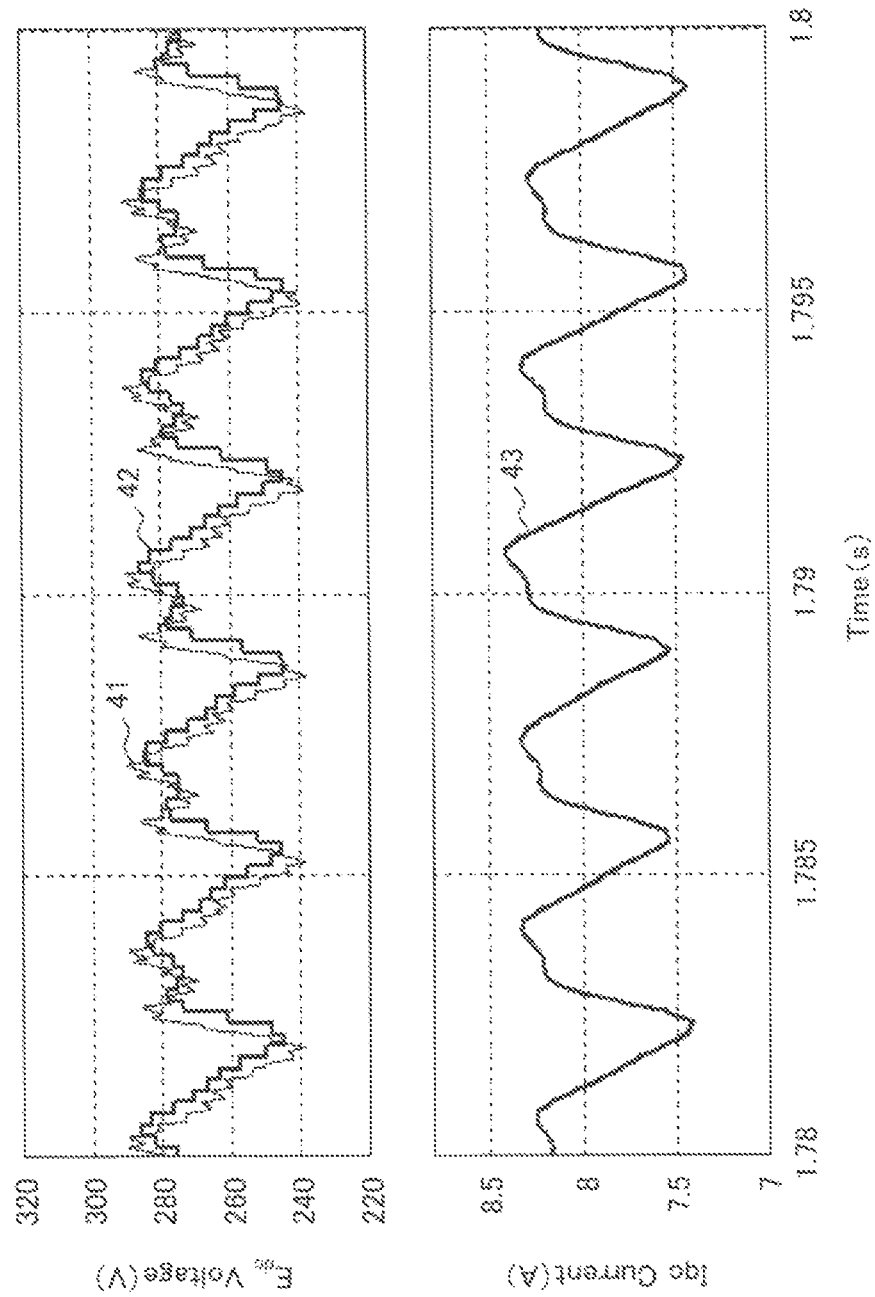
FIG. 6 is a block diagram of the direct current voltage signal waveform of the motor drive device according to the first embodiment and the qc-axis current waveform of a motor.

An upper graph of FIG. 6 illustrates examples of an actual direct current voltage waveform 41 and a direct current voltage signal waveform 42 detected at the controller 5 in the direct current voltage across the smoothing capacitor 3. It can be confirmed that the detected direct current voltage signal waveform 42 is more delayed from the actual direct current voltage waveform 41 due to the influence of the time delay described above. In the case where the ripple component of the direct current voltage $E_{dc}$ can be decreased using a capacitor having a large electrostatic capacitance, the influence of the time delay is small. However, when the smoothing capacitor 3 in a small size having a capacity of 200 µF or less is adopted as in the embodiment, the ripple component of the direct current voltage is increased, resulting in an increase in the influence of the time delay. Specifically, as illustrated in a lower graph in FIG. 6, an alternating component at the same frequency as the direct current voltage ripple frequency $\omega_{rip}$ also appears in a qc-axis current waveform 43 of the motor 6, and motor torque ripples are generated.

Therefore, in the embodiment, in order to eliminate the alternating component of a specific frequency of the dq-axis current of the motor caused by the direct current voltage ripples, the harmonic suppressor 17 illustrated in FIG. 2 is additionally provided.

Figure 7:
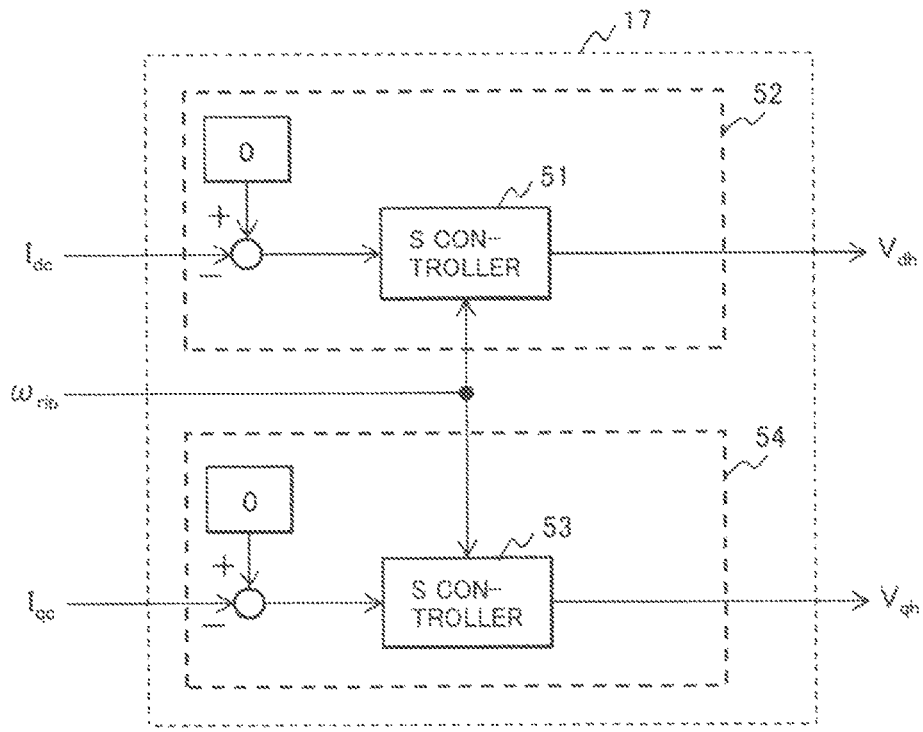
FIG. 7 is a block diagram of a harmonic suppressor of the motor drive device according to the first embodiment.

The detailed configuration of this harmonic suppressor 17 will be described with reference to FIG. 7. As illustrated in FIG. 7, in the harmonic suppressor 17, an S controller 51 operates the deviation between the dc-axis current detection value $I_{dc}$ and the command value (=0) at a d-axis harmonic suppressor 52, and the S controller 51 outputs a corrected amount $V_{dh}$ of the dc-axis voltage command value $V_{dc}$. An S controller 53 operates the deviation between the qc-axis current detection value $I_{qc}$ and the command value (=0) at a q-axis harmonic suppressor 54, and the S controller 53 outputs a corrected amount $V_{qh}$ of the qc-axis voltage command value $V_{qc}$. Note that, for the S controllers 51 and 53, the transfer function of Equation 4 is used.

[Eq. 4]

$$G(s) = \frac{K_1 \times s^2 + K_2 \times s}{s^2 + K_3 \times s + \omega_0^2} \qquad \text{Eq. 4}$$

Here, s is defined as a Laplace operator, $\omega_0$ is defined as a center frequency, and $K_1$, $K_2$, and $K_3$ are defined as control gains.

Three gains ($K_1$, $K_2$, and $K_3$) are provided on the transfer function of Equation 4. With the adjustment of these gains, the magnitude of the gain, the bandwidth, and the phase characteristic corresponding to the specific center frequency $\omega_0$ can be adjusted.

Figure 8:
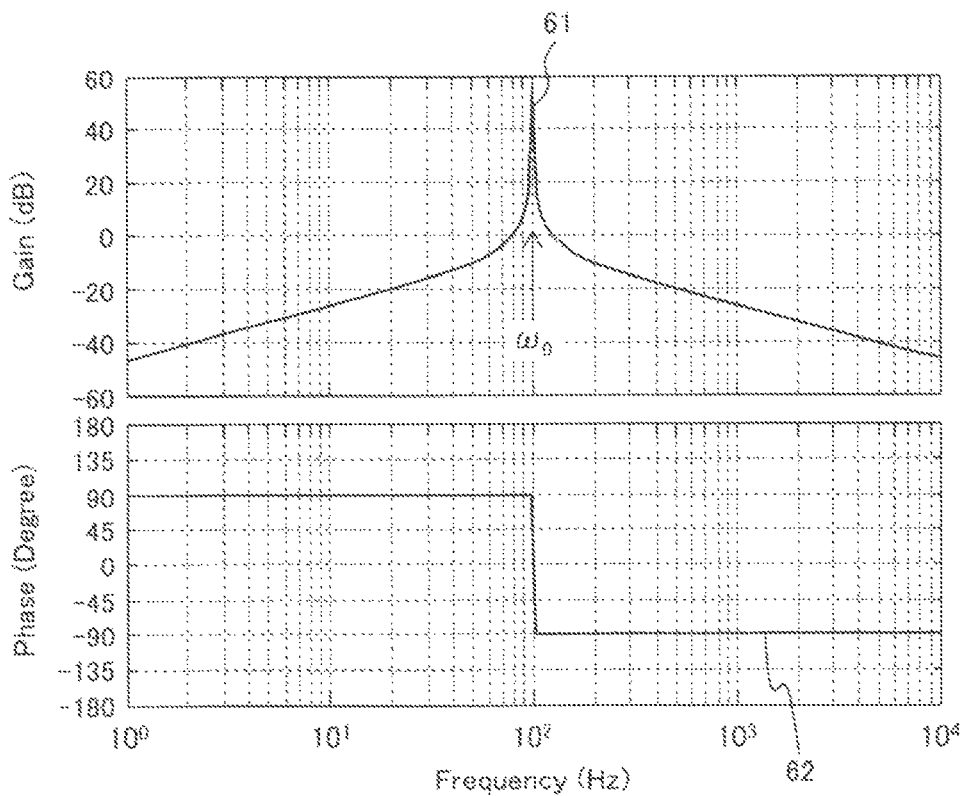
FIG. 8 is a diagram of the gain characteristic and the phase characteristic of an S controller of the motor drive device according to the first embodiment.

FIG. 8 illustrates a gain characteristic 61 and a phase characteristic 62 of the S controllers 51 and 53. As apparent from an upper graph in FIG. 8, the S controllers have a character that has a large gain at a specific center frequency $\omega_0$. In other words, only a component of the center frequency $\omega_0$ set in the transfer function of Equation 4 appears in the output of the S controller. Specifically, near the center frequency $\omega_0$, the phase is suddenly changed from an angle of 90° to an angle of −90° on the phase characteristic 62 illustrated in FIG. 8. Thus, the magnitudes of the output signals can be made the same regardless of the phase of the input signal.

As illustrated in FIG. 7, to the S controllers 51 and 53, the direct current voltage ripple frequency $\omega_{rip}$ is inputted from the ripple frequency arithmetic unit 18. The direct current voltage ripple frequency $\omega_{rip}$ is registered as a center frequency $\omega_{rip}$. Thus, the S controllers 51 and 53 extract only the component of the direct current voltage ripple frequency $\omega_{rip}$ from the input signal, and output the component.

Originally, the direct current voltage ripple frequency $\omega_{rip}$ only has to be preset according to the alternating power supply frequency $f_s$ (50/60 Hz) and the number of passes of the alternating current. However, in order to preset the direct current voltage ripple frequency $\omega_{rip}$, the adjustment of the power supply frequency is necessary when the motor drive device is shipped or installed. In the actual alternating system, the power supply frequency fluctuates in a minute range. Thus, in the case where the preregistered direct current voltage ripple frequency $\omega_{rip}$ is different from the actual ripple frequency, the effect of eliminating the beat phenomenon might be reduced.

Therefore, the ripple frequency arithmetic unit 18 according to the embodiment is configured to operate the direct current voltage ripple frequency $\omega_{rip}$ from the direct current voltage signal $E_{dc}$ and appropriately transmit the direct current voltage ripple frequency $\omega_{rip}$ to the harmonic suppressor 17. Note that, as also illustrated in FIG. 2, since the direct current voltage signal $E_{dc}$ is the detection signal necessary for the PWM controller 19, the direct voltage sensing circuit 8 dedicated to the ripple frequency arithmetic unit 18 does not have to be additionally provided.

Figure 9:
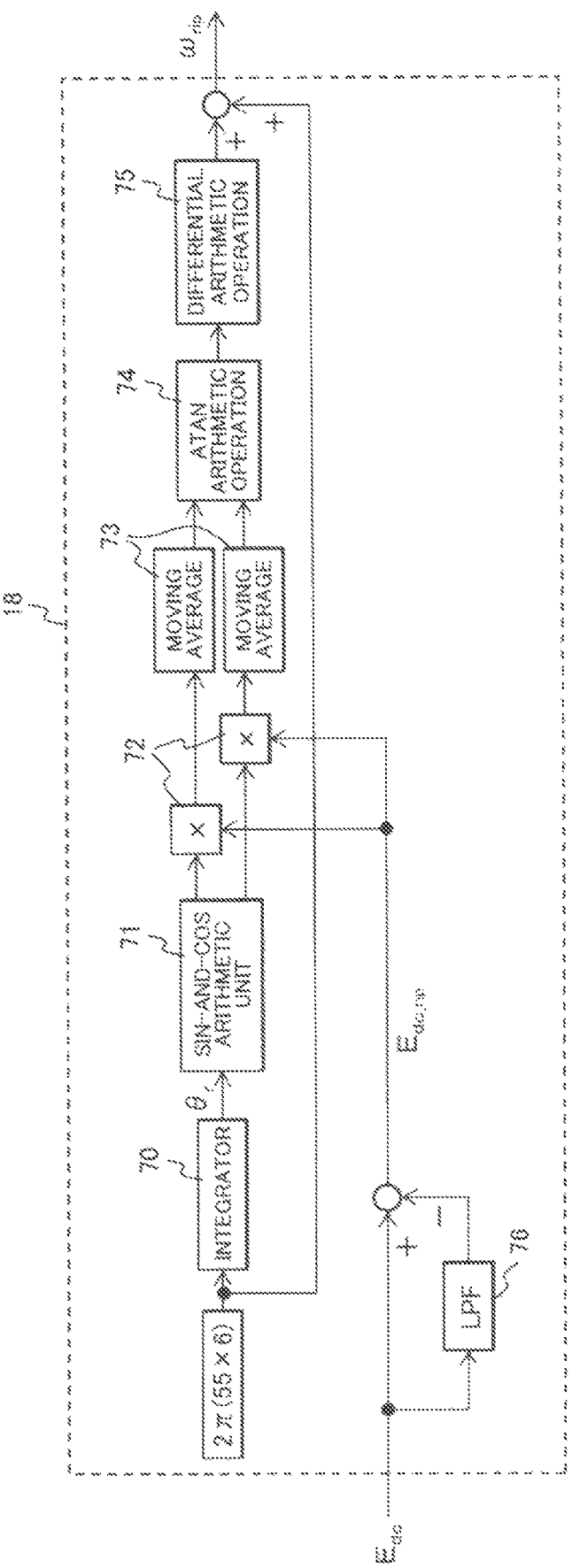
FIG. 9 is a block diagram of a ripple frequency arithmetic unit of the motor drive device according to the first embodiment.

Next, referring to a functional block diagram of FIG. 9, the function of the ripple frequency arithmetic unit 18 in FIG. 2 will be described in detail. As illustrated in FIG. 9, the ripple frequency arithmetic unit 18 mainly includes an integrator 70, a SIN-and-COS arithmetic unit 71, a multiplier 72, a moving average 73, an arctangent (ATAN) arithmetic unit 74, a differential arithmetic 75, and a low pass filter (LPF) 76.

The integrator 70 integrates a fixed input value (2π(55× 6)) to generate a phase $\theta_r$. Here, "55" included in the fixed input value is set to correspond to the median value (55 Hz) between two types of power supply frequencies 50 Hz and 60 Hz. "6" is provided in consideration of generating voltage ripples having a sixth-order frequency component of the alternating power supply frequency $f_s$ in the case where three-phase alternating current voltages are converted into direct current voltages. The SIN-and-COS arithmetic unit 71 performs sine operation and cosine operation to the phase $\theta_r$ outputted from the integrator 70, and calculates sin ($\theta_r$) and cos ($\theta_r$). On the other hand, a low frequency component outputted from the LPF 76 is subtracted from the direct current voltage signal $E_{dc}$, and hence only a ripple component $E_{dc\_rip}$ is extracted. Here, the cutoff frequency of the LPF 76 only has to be about twice the median value (55 Hz) of the power supply frequency. The ripple component $E_{dc\_rip}$ that is extracted from the direct current voltage signal $E_{dc}$ can be expressed by Equation 5.

$$E_{dc\_rip} = E_{dc\_rip1} \times \sin(\theta_{rip}) + E_{dc\_riph} \qquad \text{Eq. 5}$$

Here, $E_{dc\_rip1}$ is defined as the amplitude of the first order component of ripples, $\theta_{rip}$ is defined as the phase of the first order component of ripples, and $E_{dc\_riph}$ is defined as a higher order frequency component other than the first order component of ripples.

Both sides of the ripple component $E_{dc\_rip}$ expressed by Equation 5 are multiplied by sin ($\theta_r$) or cos ($\theta_r$), and then three types of different frequency components of $\theta_r - \theta_{rip}$, and $\theta_r + \theta_{rip}$ appear as in Equation 6 and Equation 7 below.

[Eq. 6]

$$E_{dc\_rip} \times \sin(\theta_r) = \{E_{dc\_rip1} \times \sin(\theta_{rip}) + E_{dc\_riph}\} \times \sin(\theta_r) \qquad \text{Eq. 6}$$
$$= \frac{E_{dc\_rip1}}{2} \times$$
$$\{\cos(\theta_r - \theta_{rip}) - \cos(\theta_r + \theta_{rip})\} +$$
$$E_{dc\_riph} \times \sin(\theta_r)$$

[Eq. 7]

$$E_{dc\_rip} \times \cos(\theta_r) = \{E_{dc\_rip1} \times \sin(\theta_{rip}) + E_{dc\_riph}\} \times \cos(\theta_r) \qquad \text{Eq. 7}$$
$$= \frac{E_{dc\_rip1}}{2} \times$$
$$\{-\sin(\theta_r - \theta_{rip}) - \sin(\theta_r + \theta_{rip})\} +$$
$$E_{dc\_riph} \times \cos(\theta_r)$$

In the frequency components that appear in Equations 6 and 7, the frequency components of $\theta_r$ and $\theta_r + \theta_{rip}$ have very high frequencies, and hence the frequency components can be easily removed by the low pass filter or moving average processing. In the embodiment, as illustrated in FIG. 9, the outputs of Equations 6 and 7 are processed using the moving averages 73. Note that, the length of the moving time of the moving average 73 is set to a period of a frequency that is an integral multiple of the median value (55 Hz) of the power supply frequency.

Subsequently, arctangent operation is performed on two signals after subjected to moving average processing, i.e. the signals having only the frequency component of $\theta_r - \theta_{rip}$ using the ATAN arithmetic unit 74, and ($\theta_r - \theta_{rip}$) between the low frequencies passed through the moving averages 73 is found. The difference frequency between the fixed input value (2π(55×6)) and the ripple frequency can be calculated by differentiation processing of ($\theta_r - \theta_{rip}$) (which is the difference in the discrete control system). Lastly, the fixed input value (2π(55×6)) is added to the difference frequency found at the differential arithmetic 75, and then the direct current voltage ripple frequency $\omega_{rip}$ is outputted.

As described above, the direct current voltage ripple frequency $\omega_{rip}$ can be calculated from the direct current voltage signal $E_{qc}$ by the simple arithmetic operation process illustrated in FIG. 9. Setting the calculated ripple frequency $\omega_{rip}$ to the center frequency $\omega_0$ of the S controllers 51 and 53 in the harmonic suppressor 17 enables the elimination of the influence of fluctuations in the alternating power supply frequency $f_s$.

As illustrated in FIG. 2, the voltage command values ($V_{dc}$ and $V_{qc}$) that are the outputs of the voltage controller 12 are then corrected using the corrected amounts ($V_{dh}$ and $V_{qh}$) that are the outputs of the harmonic suppressor 17, and hence motor voltage commands ($V_{dc}^*$ and $V_{qc}^*$) that eliminate the influence of the direct current voltage ripple frequency $\omega_{rip}$ can be calculated. The two-axle-to-three-phase converter 13 then calculates three-phase command voltages ($V_u^*$, $V_v^*$, and $V_w^*$) based on Equation 8 and Equation 9 below using the motor voltage commands ($V_{dc}$ and $V_{qc}^*$) and the phase information $\theta_{dc}$ from the speed-and-phase estimator 14.

[Eq. 8]
$$\begin{pmatrix} V_\alpha \\ V_\beta \end{pmatrix} = \begin{pmatrix} \sin(\theta_{dc}) & \cos(\theta_{dc}) \\ -\cos(\theta_{dc}) & \sin(\theta_{dc}) \end{pmatrix} \begin{pmatrix} V_{dc}^* \\ V_{qc}^* \end{pmatrix} \quad \text{Eq. 8}$$

[Eq. 9]
$$\begin{pmatrix} V_u^* \\ V_v^* \\ V_w^* \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} V_\alpha \\ V_\beta \end{pmatrix} \quad \text{Eq. 9}$$

Lastly, the PWM controller 19 calculates percentage modulation at the PWM controller 19 using the three-phase command voltages ($V_u^*$, $V_v^*$, and $V_w^*$) from the two-axle-to-three-phase converter 13 and the direct current voltage signal $E_{dc}$ from the direct voltage sensing circuit 8, and then generates the PWM signal for the inverter circuit 4. The semiconductor switching devices of the inverter circuit 4 are turned on and off according to the PWM signal, and output pulsating voltages (the amplitude value is changed according to the direct current voltage, and the width is changed according to the PWM signal) from the output terminals of the phases.

Figure 10:
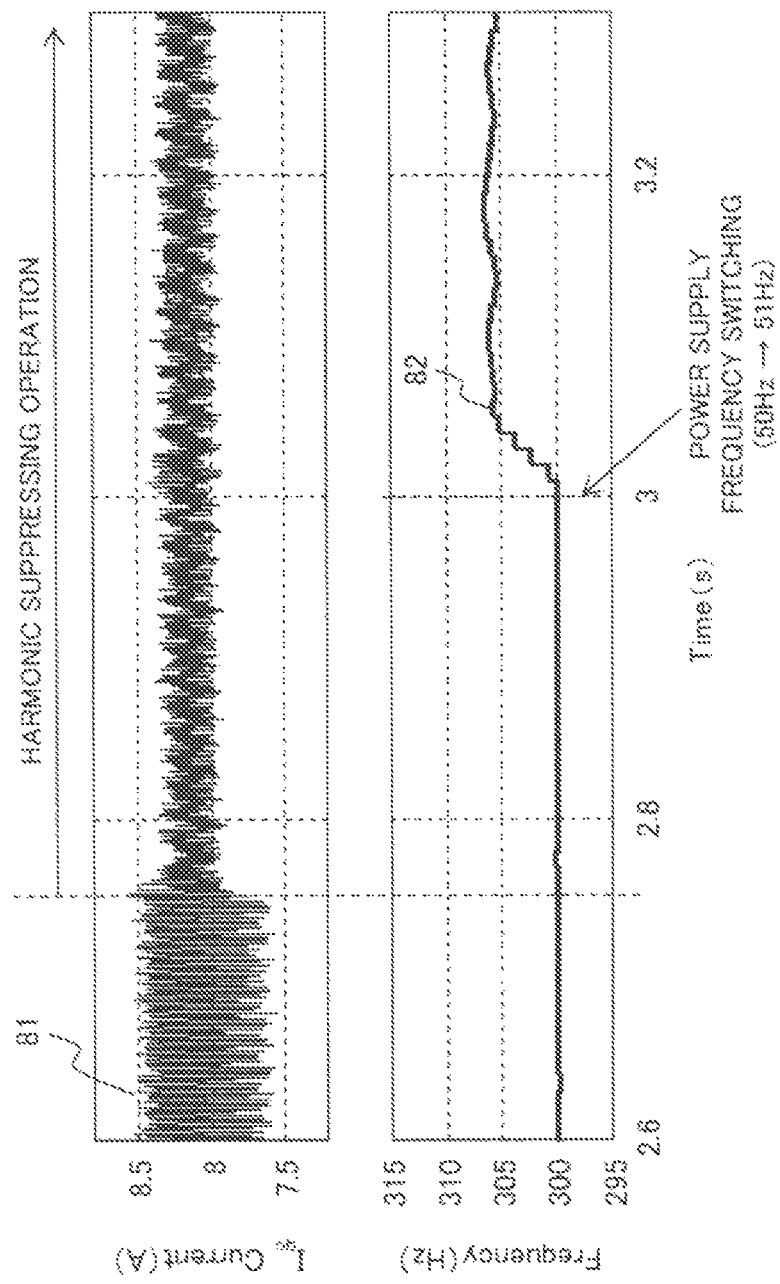
FIG. 10 is a diagram of the qc-axis current waveform of the motor and the direct current voltage ripple frequency waveform of the motor drive device according to the first embodiment.

FIG. 10 is a diagram of the demonstrated result showing the effect of the harmonic suppressor 17 and the ripple frequency arithmetic unit 18 according to the embodiment. The behavior in a period from 2.75 s to 3.0 s on the time base can provide the confirmation that the operation of the harmonic suppressor 17 reduces the amplitude of a qc-axis current waveform 81 of the motor 6 to a half of the amplitude or less. The behavior in a period at 3.0 s and after on the time base can provide the confirmation that even though the power supply frequency $f_s$ of the three-phase alternating power supply is suddenly changed from 50 Hz to 51 Hz, a waveform 82 of the direct current voltage ripple frequency $\omega_{rip}$ outputted from the ripple frequency arithmetic unit 18 quickly follows a change in the alternating power supply frequency $f_s$, and this following is reflected on the harmonic suppressor 17, resulting in the elimination of the influence of the sudden change in the alternating power supply frequency $f_s$ on the q-axis current waveform 81.

As described above, the embodiment can provide a motor drive device that eliminates the distortion of the motor current caused by direct current voltage ripples and eliminates the beat phenomenon of the output torque of a motor without adopting any smoothing capacitor having a large capacity and with no need of an additional component such as a dedicated detection circuit.

Second Embodiment

Figure 11:
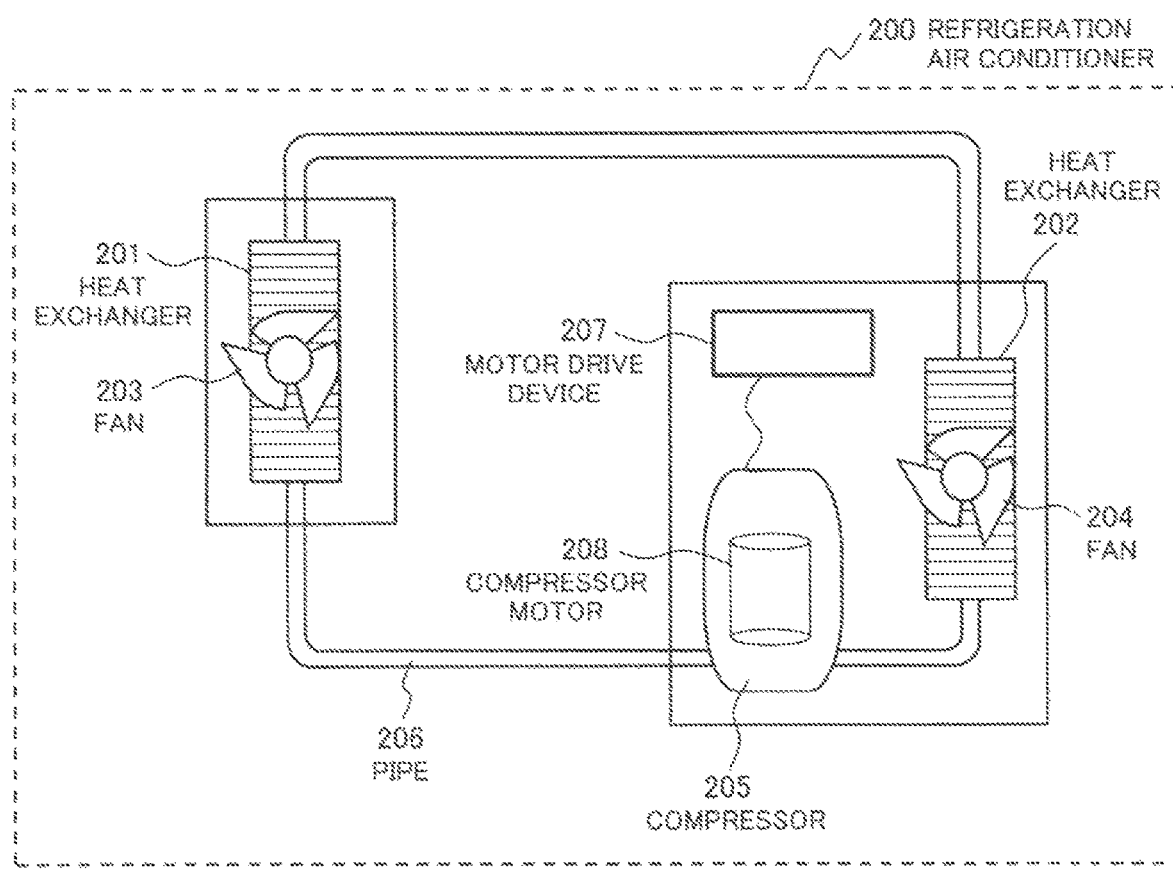
FIG. 11 is a block diagram of refrigeration equipment according to a second embodiment.

FIG. 11 is a block diagram of refrigeration equipment, such as an air conditioner and a refrigerator, according to a second embodiment of the present invention.

Refrigeration equipment 200 is an apparatus that conditions the air temperature. The refrigeration equipment 200 is configured in which an outdoor unit is connected to an indoor unit with a coolant pipe 206. Here, the outdoor unit includes an outdoor heat exchanger 202 that performs heat exchange between a coolant and air, an outdoor fan 204 that ventilates the outdoor heat exchanger 202, and a compressor 205 that compresses and circulates the coolant.

The compressor 205 has a compressor motor 208 including a permanent magnet synchronous motor inside. The compressor is driven by driving the compressor motor 208 with a motor drive device 207. The motor drive device 207 converts the alternating current voltage of the alternating power supply into a direct current voltage, and provides the direct current voltage to the motor driving inverter to drive the motor.

Although no illustration of a detailed structure is provided for the compressor 205, a rotary compressor and a scroll compressor, for example, are adopted. The compressor 205 includes a compression mechanism inside. The compression mechanism is driven by the compressor motor 208. When the compressor 205 is a scroll compressor, the compression mechanism is configured of a fixed scroll and a turning scroll, in which the turning scroll is rotated on the fixed scroll to form a compression chamber between the scrolls.

With the use of the motor drive device 100 according to the first embodiment as the motor drive device 207, the distortion of the motor current can be eliminated, and high control performance can be secured even though the voltage ripples are present in the direct current voltage. With the use of the motor drive device 100 according to the first embodiment in the refrigeration equipment, vibrations and noise of the refrigeration equipment can be reduced.

REFERENCE SIGNS LIST

100 . . . motor drive device
1 . . . alternating power supply
2 . . . rectifier circuit
3 . . . smoothing capacitor
4 . . . inverter circuit
5 . . . controller
6 . . . motor
7 . . . current sensing circuit
8 . . . direct voltage sensing circuit
8r . . . resistor
8c . . . capacitor
10 . . . speed controller
11 . . . d-axis current command generator
12 . . . voltage controller
13 . . . two-axle-to-three-phase converter
14 . . . speed-and-phase estimator
15 . . . three-phase-to-two-axle converter
16 . . . current reproduction arithmetic unit
17 . . . harmonic suppressor
18 . . . ripple frequency arithmetic unit
19 . . . PWM controller
21 . . . axis error arithmetic unit 22 ... speed estimator
23 ... phase arithmetic unit
24 ... motor constant
30 ... analog-to-digital converter
31 ... buffer memory
41 ... direct current voltage waveform
42 ... direct current voltage signal waveform
43 ... q-axis current waveform
51, 53 ... S controller
52 ... d-axis harmonic suppressor
54 ... q-axis harmonic suppressor
61 ... gain characteristic of S controller
62 ... phase characteristic of S controller
70 ... integrator
71 ... SIN-and-COS arithmetic unit
72 ... multiplier
73 ... moving average
74 ... ATAN arithmetic unit
75 ... differential arithmetic
76 ... low-pass filter
200 ... refrigeration equipment
201, 202 ... heat exchanger
203, 204 ... fan
205 ... compressor
206 ... pipe
207 ... motor drive device
208 ... compressor motor

The invention claimed is:

1. A motor drive device having an alternating power supply connected on an input side and a motor connected on an output side, the motor drive device comprising:
a rectifier circuit configured to convert an alternating current voltage supplied from the alternating power supply into a direct current voltage;
a smoothing capacitor configured to smooth a direct current voltage outputted from the rectifier circuit, the smoothing capacitor being formed of a film capacitor or a capacitor having a capacity of 200 microfarad or less;
voltage detecting means configured to detect a voltage across the smoothing capacitor and output a direct current voltage signal;
an inverter circuit configured to convert a direct current voltage outputted from the smoothing capacitor into an alternating current voltage;
current sensing means configured to detect a direct current or an alternating current of the inverter circuit and output a current signal; and
a controller configured to control the inverter circuit based on the direct current voltage signal and the current signal,
wherein the controller includes:
a voltage controller configured to generate a voltage command value used for controlling the motor,
a ripple frequency arithmetic unit configured to operate a ripple frequency included in the direct current voltage signal, and
a harmonic suppressor configured to process a signal based on the current signal using an S controller having a gain near the ripple frequency and output a corrected amount; and
the inverter circuit is controlled based on a signal that the voltage command value is corrected using the corrected amount,
wherein the ripple frequency arithmetic unit calculates a ripple frequency of the direct current voltage signal by extracting a ripple component of the direct current voltage signal, generating a signal having a different frequency component through a multiplication process of a sine wave and a cosine wave of a fixed frequency, and operating a phase through arctangent operation on a difference frequency component between a frequency of the ripple component and the fixed frequency.

2. The motor drive device according to claim 1, wherein for the S controller, a transfer function below is used,

[Eq. 1]

$$G(s) = \frac{K_1 \times s^2 + K_2 \times s}{s^2 + K_3 \times s + \omega_{rip}^2} \qquad \text{Eq. 1}$$

where s is defined as a Laplace operator, $\omega_{rip}$ is defined as a ripple frequency, and K1, K2, and K3 are defined as control gains.

3. The motor drive device according to claim 1, wherein the ripple frequency arithmetic unit extracts a difference frequency component between the ripple frequency and the fixed frequency using a moving average or a low pass filter.

4. Refrigeration equipment comprising a compressor, wherein the compressor has a built-in motor; and the motor is driven using the motor drive device according to claim 1.

* * * * *